United States Patent [19]

Kindrick et al.

[11] 4,226,635

[45] Oct. 7, 1980

[54] EXTENDED BACO$_3$ FOR BRICK SCUM PREVENTION

[75] Inventors: Robert H. Kindrick, Bartlesville, Okla.; Benjamin C. Harrison, Homewood, Ill.

[73] Assignee: The Sherwin-Williams Company, Cleveland, Ohio

[21] Appl. No.: 45,149

[22] Filed: Jun. 4, 1979

[51] Int. Cl.$^2$ .......................... C04B 31/44; C09C 1/02
[52] U.S. Cl. ....................................... 106/306; 106/71; 106/308B; 423/431
[58] Field of Search ................... 423/431; 106/308 B, 106/306, 289, 288 B, 71, 72

[56] References Cited

U.S. PATENT DOCUMENTS

| | | | |
|---|---|---|---|
| 1,851,844 | 3/1932 | Jeavons | 106/313 |
| 3,421,843 | 1/1969 | Conaway et al. | 423/431 |
| 3,738,938 | 6/1973 | Barrett | 106/308 B |
| 3,802,901 | 4/1974 | Robertson et al. | 106/308 B |
| 4,102,814 | 7/1978 | Gustin | 106/288 B |

Primary Examiner—Helen M. McCarthy
Attorney, Agent, or Firm—Robert E. McDonald; James V. Tura

[57] ABSTRACT

This invention relates to an improved barium carbonate prepared by precipitating barium carbonate on an inert core to effectively increase its sulfate scavenging utility by providing enhanced reactivity and dispersibility. This invention is especially useful in the prevention of efflorescence and scumming of bricks or ceramic tile caused by the migration of soluble sulfates during their manufacture.

7 Claims, No Drawings

EXTENDED BACO₃ FOR BRICK SCUM PREVENTION

FIELD OF THE INVENTION

This invention relates to improved barium carbonate products and the use of these products to prevent efflorescence and scumming of bricks and tile during their manufacture.

BACKGROUND

The use of barium carbonate to remove water soluble sulfates in industrial applications is well known. Appropriate literature discussions of use and reactivity of barium carbonate as a scum control agent are given in Moody, "Effect of Particle Size and Deflocculation of Barium Carbonate on Scum Control", Am. Cerm. Soc. Bull., 44 (8) 604–607 (1965) and in Dingle, "Reactivity of Barium Carbonate of Combatting Scumming in Structural Clay Products", Am. Ceram. Soc. Bull., 46 (9) 856–863 (1967) as well as in many other articles.

One of the common uses of barium carbonate is in the manufacture of bricks or tile. During this manufacturing process, the soluble sulfates present in shale or clay migrate to the surface during the fire hardening and calcination of the composite mass. This process is called scumming. The addition of even small amounts of barium carbonate to the mix prior to fire hardening and calcination will prevent the scumming. The barium carbonate reacts with the soluble sulfates to form very insoluble carbonates and sulfate salts which do not produce scum.

There are, however, many problems with the use of barium carbonate in this application. First, due to the insolubility of barium sulfate and barium carbonate, only the exterior surfaces of the barium carbonate particles are reactive to soluble sulfate ion. This is, therefore, a limiting factor in the chemical utilization of the barium carbonate as a scum preventive reagent.

It is also well known that the reactivity of barium carbonate for this application is dependent upon its crystalline form and particle size, the nodular amorphous particles of the smallest particle sizes being the most reactive. This leads to the second problem with use of barium carbonate in this application and that is that dispersion and handling of such small particle size pigments becomes disproportionately more difficult as the particle size decreases. This arises from the fact that the surface and edge potentials increase exponentially as the particle size decreases. Therefore, decreasing the particle size causes an increase in agglomeration of individual particles and poorer dispersion characteristics. Because of this problem, commercial grades of barium carbonate often do not flow well and they have a tendency to form lumps which are difficult to disperse. The manufacturer must, therefore, optimize particle size, surface area and dispersibility. This has resulted in the products presently on the market having a utilization between 30% and 50% of the contained barium carbonate.

Several ways to solve these problems have been proposed. The addition of additives such as magnesium silicate help make the barium carbonate more free-flowing. Even this improvement, however, tends to decrease with time. Barium carbonate has been produced in a more free-flowing crystal form but these crystals either tend to be so large that there is little surface area per unit weight and, therefore, low reactivity or so small that although they are reactive they are of very low bulk density and inconvenient for use in current industrial feeders.

U.S. Pat. No. 3,322,683 teaches the use of a dispersion of barium carbonate of limited particle size and reactivity by incorporating a small amount of a hydrophilic dispersant and water. None of the prior art, however, suggests the use of an improved barium carbonate produced by precipitating barium carbonate on an inert core to improve both reactivity and dispersibility.

Generally, the barium carbonate ranges from about 10% to 90% by weight of the total product and preferably from 20% to 60% by weight of the total product.

SUMMARY OF THE INVENTION

According to this invention, a barium carbonate product having improved dispersibility, handling and reactivity as a scum preventive agent is prepared by precipitating a thin, crystalline coating of barium carbonate on an inert core. This barium carbonate product is prepared by reacting aqueous barium sulfide with sodium carbonate or carbon dioxide, etc. to produce effective amounts of e.g. above 10% of barium carbonate in the presence of a suspended inert core. The barium carbonate is insoluble in water and precipitates out to cover the suspended inert material.

It is an object of this invention to provide a stable barium carbonate product with high reactivity as a chemical scavenging agent. Another object of this invention is to provide a barium carbonate product with improved flow properties and the proper density in its dry form for easier shipping, handling and metering. Another object of this invention is to provide a barium carbonate product which is more easily dispersed during mixing.

A further object is to maintain a dispersible sized particle and further maximize the utility of the barium carbonate content by precipitating a thin crystalline coating of barium carbonate on an inert core, thereby increasing barium carbonate reactivity by increasing its surface to volume ratio.

These and other objects of this invention will be apparent from the following description of the invention.

DESCRIPTION OF THE PREFERRED EMBODIMENTS

One advantage of the improved barium carbonate is that it provides a product with very high barium carbonate reactivity per gram of composite pigment. The reactivity of the contained barium carbonate is determined by the method of A. L. Bennet and H. R. Goodrich, "The Reactivity Test of Determining the Value of Barium Carbonate as a Scum Preventative", J. Am. Ceram. Soc., 13 (7) 461–69 (1930).

In the following examples, unless otherwise stated, figures given represent parts by weight, reactivity as determined by the method of Bennet and Goodrich, and the surface area as determined by nitrogen absorption. The percent composition of the solid pigment is determined by a volumetric determination of % barium carbonate. In this analysis the barium carbonate is dissolved from the inert core by hydrochloric acid. This solution is diluted with distilled water and then titrated with the complexing agent, Diethylenetrinitrilopentaacetic acid (DTPA) in the presence of Eriochrom Black T indicator.

EXAMPLE 1

1100 parts by weight of Black Ash is leached with 5500 parts by weight of water at 85° C. and then filtered to produce 14° Be" barium sulfide liquor. This liquid was transferred to a large heated, three-neck Pyrex flask, equipped with stirring bar, thermometer and tubing to allow gases to be bubbled into the flask below the liquid level. While stirring, 826.5 parts by weight of amorphous silica (Reynolds RS-1) is added to the barium sulfide liquid. Carbon dioxide gas is bubbled into this mixture while stirring and the reaction is maintained at 85° C. until lead acetate indicator paper shows no more hydrogen sulfide gas coming off. 30 parts by weight of sodium carbonate is then added to this slurry and the reaction allowed to continue for one additional hour. This material was then filtered and dried at 110° C., calcined for one hour at 500° C., cooled and hammer milled. The product characteristics were as follows:

TABLE I

| Composition of Cored $BaCO_3$ Pigment | |
|---|---|
| Composition | 46% $BaCO_3$/54% $SiO_2$ |
| Bulk Density | 19.8 lbs./ft.$^3$ |
| Surface Area | 21 m$^2$/gm |
| Fisher No. | 0.50 |

The Fisher No. is a measure of particle size well known within the art. Lower Fisher numbers indicate smaller particle size.

This product was then compared to several commercial grades of barium carbonate with respect to reactivity. These results are given in Table II.

TABLE II

% Reactivity of $BaCO_3$ as Determined by the Method of Bennett and Goodrich

| | | % Reactivity | |
|---|---|---|---|
| Product | % $BaCO_3$ | on $BaCO_3$ | on Equal Weight |
| SWC 70F | 100% | 40.7 | 40.7 |
| CP Micro Flow | 100 | 28.7 | 28.7 |
| FMC | 100 | 37.6 | 37.6 |
| | | 34.3 | 34.3 |
| CP Aqua Flow | 100 | 37.4 | 37.4 |
| Example I | 46 | 68.0 | 31.3 |

As shown in Table II, the product produced in Example I shows a much higher percent reactivity of its barium carbonate than the commercially available barium carbonates. Although it is not our intent to be bound by theory, we believe this higher reactivity is due to the fact that the product prepared by precipitating barium carbonate on an inert core produces a much higher surface to volume ratio for barium carbonate because much less of the barium carbonate is "wasted" by being within the core where it cannot react. Since the inert core will typically be less expensive then the barium carbonate itself, the same total reactivity can be provided using less barium carbonate and more cost effective product.

A preferred sulfate scavenging pigment is one that is easily metered into and dispersed with other dry materials in the manufacturing process. It should have a minimum particle to particle cohesive interaction in the dry state so as to flow evenly from bins, thereby creating a consistent product mix. The use of the extended barium carbonate product produced in Example I provides this surprising additional advantage in that the cored barium carbonate product provides much better dry flow characteristics than commercial barium carbonate materials. This comparison is given in Table III:

TABLE III

Comparative Flow Characteristics (Measured by Dry Flow Angle Meter)

| Product | Peak Break Angle | All Flow Angle |
|---|---|---|
| SWC 70F | 45 | — |
| CP Micro Flow | 26 | 52 |
| FMC | 36 | 36 |
| FMC | 38 | 46 |
| Example I | 10 | 30 |

The fact that the cored barium carbonate has much better dry flow than the commercial products means that it is considerably easier to handle, easier to discharge from hoppers and easier to disperse in the ceramic mix.

Examples II, III and IV show the use of a process similar to that of Example I but use different ratios of barium sulfide to silica dioxide to produce varying amounts of barium carbonate in the final product. These products were calcined at various temperatures to determine if there is any effect on performance due to calcination temperature.

EXAMPLE II 1800 parts by weight of Black Ash was leached with 3000 parts by weight of 85° C. water. This was filtered and washed with approximately 3000 additional parts by weight of 85° C. water to give 14° Be' barium sulfide liquor. Five liters of the 14° Be' barium sulfide liquor was transferred to a large, heated three-neck flask as in Example I. 800 grams of amorphous silica (Reynolds RS-1) was added while stirring. After the addition of the silica dioxide, carbon dioxide is bubbled into the 85° C. reaction mixture until lead acetate indicator paper showed little hydrogen sulfide gas coming off (approximately 8 hours). During the course of the reaction additional water was added as necessary to control viscosity. 100 grams of sodium carbonate was added to the reaction mixture and allowed to stand overnight. The product was then filtered, washed with water and dried at 110° C. This product was then divided into four parts. One part did not receive additional heating. The second part was calcined for one hour at 220° C. The third part was calcined for one hour at 330° C. The fourth part was calcined for one hour at 440° C. A summary of the characteristics of these materials is given in Table IV.

EXAMPLE III

Additional samples of cored barium carbonate were produced in the manner shown in Example II, but here the quantities were 3.75 liters of 15° Be' barium sulfide liquor and 975 grams of amorphous silica (Reynolds RS-1). A summary of characteristics is given in Table IV.

EXAMPLE IV

Additional samples of cored barium carbonate were produced in the manner shown in Example II, but here the quantities were 2.5 liters of 15° Be' barium sulfide liquor and 1170 grams of amorphous silica (Reynolds RS-1). A summary of characteristics is given in Table IV.

TABLE IV

Composition, Calcination Temperature and Properties of Cored Barium Carbonate

| Sample No. | BaCO$_3$/SiO$_2$ | Calcination Temp. °C. | % Reactivity on Weight of BaCO$_3$ | % Reactivity per gram of Product | Surface Area meter$^2$/gram |
|---|---|---|---|---|---|
| Example II-A | 48/52 | 110 | 63.4 | 30.5 | 18.9 |
| Example II-B | 48/52 | 220 | 68.7 | 33.0 | 17.7 |
| Example II-C | 48/52 | 330 | 68.3 | 32.8 | 17.6 |
| Example II-D | 48/52 | 440 | 68.2 | 32.7 | 17.7 |
| Example III-A | 35.7/64.3 | 110 | 87.1 | 31.1 | 16.9 |
| Example III-B | 35.7/64.3 | 220 | 75.2 | 26.9 | 16.3 |
| Example III-C | 35.7/64.3 | 330 | 80.9 | 28.9 | 16.7 |
| Example III-D | 35.7/64.3 | 440 | 84.4 | 30.2 | 16.9 |
| Example IV-A | 24.1/75.9 | 110 | 98.2 | 23.7 | 17.9 |
| Example IV-B | 24.1/75.9 | 220 | 85.1 | 20.5 | 17.6 |
| Example IV-C | 24.1/75.9 | 330 | 84.1 | 20.4 | 17.4 |
| Example IV-D | 24.1/75.9 | 440 | 95.1 | 22.9 | 17.6 |

Table IV shows that the percent reactivity (as a function of weight of barium carbonate) increases as the ratio of BaCO$_3$/SiO$_2$ decreases. This is predictable from the availability concept for extension. That is, since only the surfaces of the barium carbonate are available for reaction, the barium carbonate inside the outer surface is not reactive. Therefore, the more extended the barium carbonate is (lower BaCO$_3$/SiO$_2$ ratio), the greater the percentage of total barium carbonate that is near the surface and available for reaction.

Examples V and VI deal with the actual use of the cored barium carbonate pigments as a scum suppressant in ceramic manufacture.

EXAMPLE V

Part 1 (Preparation of Cored Barium Carbonates)

Three samples of cored barium carbonate were prepared in the manner described in Example I to give BaCO$_3$/SiO$_2$ ratios of 48/52, 46/54 and 24/76.

Part 2 (Preparation of Actual Ceramic Bar to Test Barium Carbonate Effectiveness)

A mixed shale containing 3.5 pounds of SO$_4^{--}$ per ton was ground and screened. Ten pound batches were weighed and dry mixed with several levels of each of the cored barium carbonate products prepared in Part 1 or with several levels of commercial grade barium carbonate. Water was added as necessary to obtain the correct viscosity. Bars were extruded and dried for about 24 hours. These bars were then calcined for 32 hours. The various samples were all burned in the same kiln on the same schedule. The various fired bars were then inspected to determine the lowest levels of each of the pigments to show only slight scum (slight scum is defined as first evidence of scum visible to the naked eye) and to show total suppression of scum (no visible evidence of scum). These results are summarized in Table V.

TABLE V

Scum Suppression Levels of Various BaCO$_3$ Pigments

| Pigment | % BaCO$_3$ | Lbs. BaCO$_3$/Ton Shale for Total Suppression | Lbs. BaCO$_3$/Ton Shale for only Slight Scum |
|---|---|---|---|
| A (Commercial Product) | 100 | 3.6 | 2.9 |
| B (Commercial Product) | 100 | 3.6 | 2.9 |
| C (Commercial Product) | 100 | 3.6 | 2.9 |
| D (Example V Cored BaCO$_3$) | 48 | 2.3 | 1.8 |
| E (Example V Cored BaCO$_3$) | 46 | 2.2 | 1.7 |
| F (Example V Cored BaCO$_3$) | 24 | 1.9 | 1.7 |

It can be observed from Table V that pigments which have barium carbonate extended on a silica core demonstrate better utilization of barium carbonate in preventing scum in actual brick applications.

EXAMPLE VI

Part 1 (Preparation of Cored Barium Carbonate)

A slurry of about 60 pounds of amorphous silica (Reynolds RS-1) and 30 gallons of barium sulfide liquor at 19.6° Be' was prepared in a 55 gallon drum. The homogeneous mixing of the slurry was achieved by continuous agitation with a portable mixer. While under continuous agitation, about 30 pounds of a chemical grade soda ash was added to the slurry. The agitation was continued for about one and one-half hours to complete the precipitation of the barium carbonate on the amorphous silica. The reaction is as follows:

$$Na_2CO_3(s) + BaS\ (aq) \rightarrow BaCO_3(s) + Na_2S\ (aq)$$

The sodium sulfide in water is decanted from the precipitated cored barium carbonate and the cored material is washed thoroughly with water. The cored barium carbonate was dried and hammer milled and had the following characteristics:

| | |
|---|---|
| BaCO$_3$ | 44.9% |
| Density | 57 pounds/ft$^3$ |

Part 2 (Preparation of Actual Ceramic Bar to Test Barium Carbonate Effectiveness)

A mixed shale containing 2.9 pounds of SO$_4^{--}$ per ton was ground and screened. Small samples of this material were dry mixed with several levels of the cored barium carbonate product produced in Part 1. Water was added as necessary to obtain the correct viscosity. Bars were extruded and dried for 24 hours and then calcined for 32 hours. These bars were then inspected to determine the effect of various levels of the cored barium carbonate on scum suppression. This product showed complete suppression of scum at 1.9 pounds of barium carbonate per ton of shale and only slight scum at 1.6 of barium carbonate per ton of shale.

It should be understood that any inert core which does not interfere with the reactivity of the barium carbonate could be used within the teachings of this invention. Numerous pigments well known within the art could be used as the inert core. These include, but are not limited to, amorphous silicas, crystalline silicas, talcs, micas, barytes, calcium carbonate, zinc oxide, titanium dioxide and the like. Colored pigments such as red iron oxide, manganese dioxide and others could also be used. Amorphous silica is the preferred core, however, because it is inexpensive and imparts especially good flow properties to the final extended barium carbonate product.

While this invention has been described by a number of specific embodiments, it is obvious that other variations and modifications may be made without departing from the spirit and scope of the invention as set forth in the appended claims.

The invention claimed is:

1. A barium carbonate product useful as a chemical scavenger which consists essentially of an inert core and an effective amount of a thin crystalline layer of above about 10% by weight of barium carbonate precipitated in situ upon said core.

2. The product of claim 1 wherein the barium carbonate ranges from about 10 to 90 percent by weight.

3. The product of claim 1 wherein the inert core is silica.

4. The product of claim 3 wherein the inert core is amorphous silica.

5. A process for producing an extended barium carbonate product which comprises suspending a finely-divided inert material in water, generating barium carbonate in the presence of said suspended inert material and precipitating above about 10% by weight barium carbonate upon the surface of said suspended inert material.

6. The process of claim 5 wherein the finely-divided inert material is silica.

7. The process of claim 6 wherein said finely-divided inert material is amorphous silica.

* * * * *